United States Patent [19]

Elias

[11] 4,188,821

[45] Feb. 19, 1980

[54] LOAD MEASUREMENT DEVICE

[75] Inventor: Charles R. Elias, Livonia, Mich.

[73] Assignee: Ex-Cell-O Corporation, Troy, Mich.

[21] Appl. No.: 882,838

[22] Filed: Mar. 2, 1978

[51] Int. Cl.² .............................................. G01L 3/14
[52] U.S. Cl. .................. 73/136 R; 73/141 A
[58] Field of Search ................ 73/141 A, 136 R, 144, 73/140

[56] References Cited

U.S. PATENT DOCUMENTS

| | | | |
|---|---|---|---|
| 2,927,457 | 3/1960 | Pye et al. | 73/136 R X |
| 3,224,262 | 12/1965 | Shipley | 73/136 R |
| 3,763,701 | 10/1973 | Wright et al. | 73/144 |
| 3,832,897 | 9/1974 | Schenck | 73/136 R |
| 4,052,891 | 10/1977 | Bartlett | 73/144 |

*Primary Examiner*—Charles A. Ruehl
*Attorney, Agent, or Firm*—Frank D. Risko; James H. Bower

[57] ABSTRACT

Apparatus for sensing and measuring the torque output of a rotary device such as a gear reduction box by inserting an especially machined or configured adaptor between the shaft bearing and the bearing mounting housing. This adaptor transducer will have strain gages mounted on it in spaced relationship so that the tangential force from the gears reacting on a shaft will produce a deflection in the adaptor transducer which will be detected by the strain gages. The strain gage signal then will be sensed, amplified and can be recorded on an analog read out type meter or monitored continuously on a pen-type recorder or other conventional instruments. The strain gages can be calibrated so the output of the recorder will convert the signal into a direct reading of the torque output transmitted through the gear reduction box.

14 Claims, 12 Drawing Figures

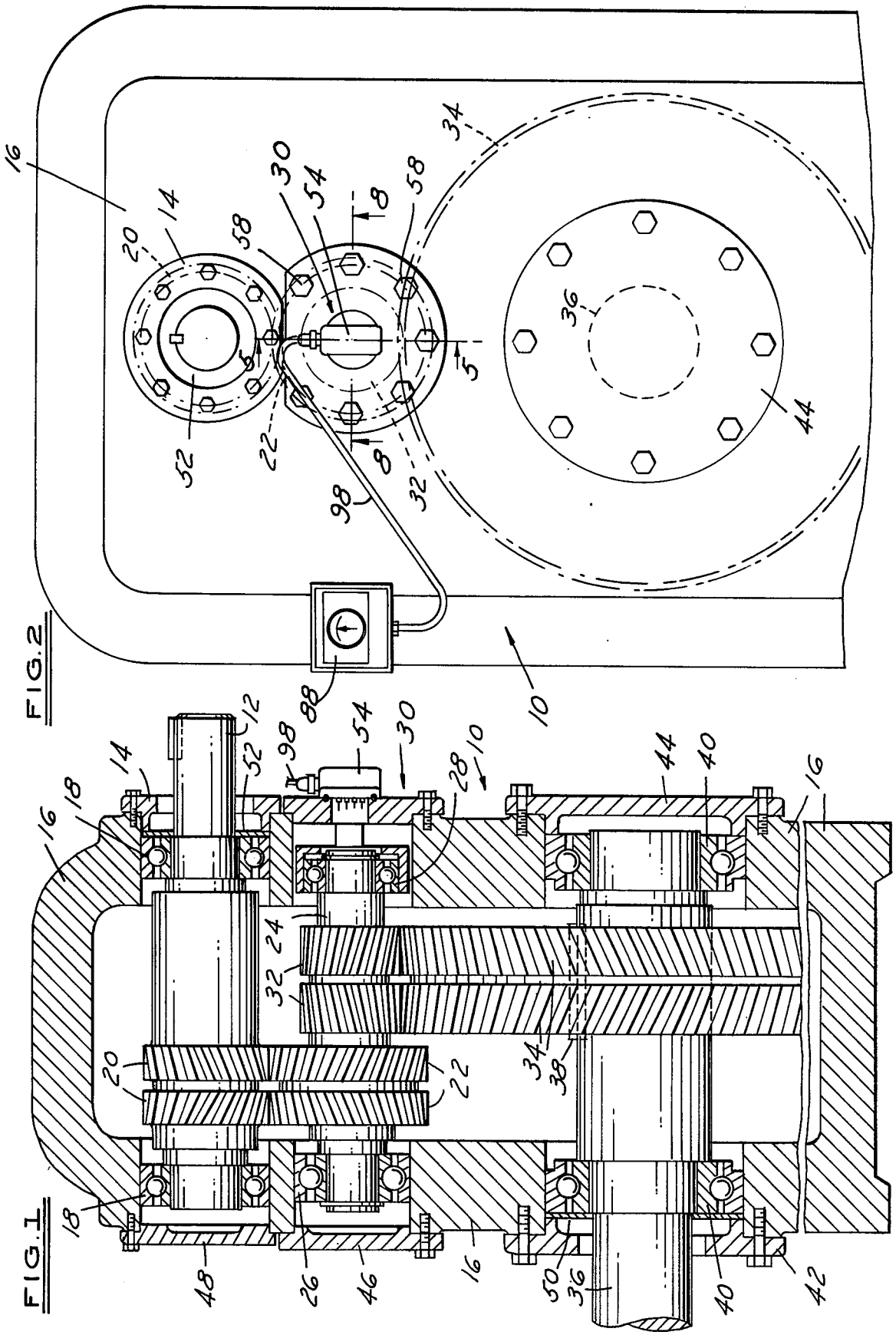

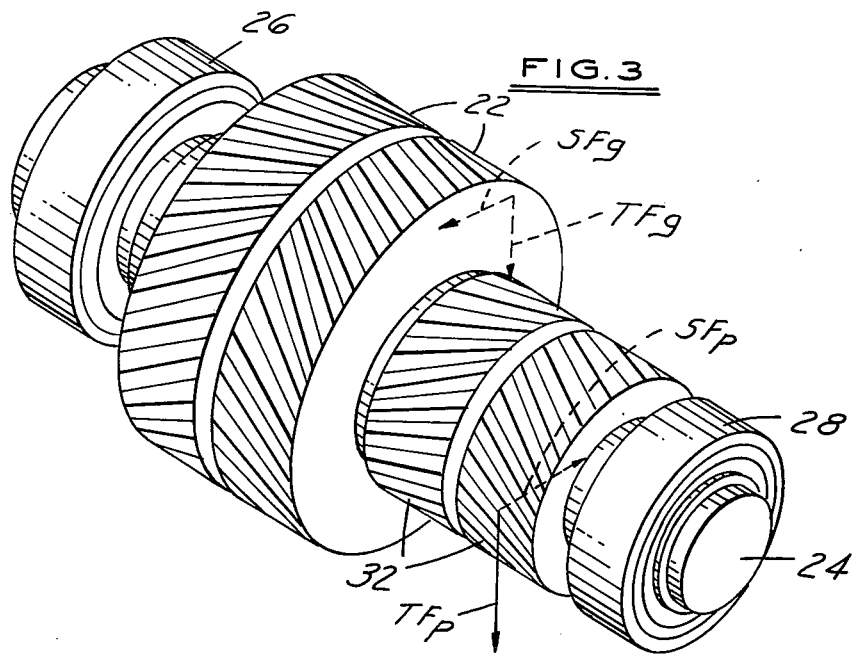
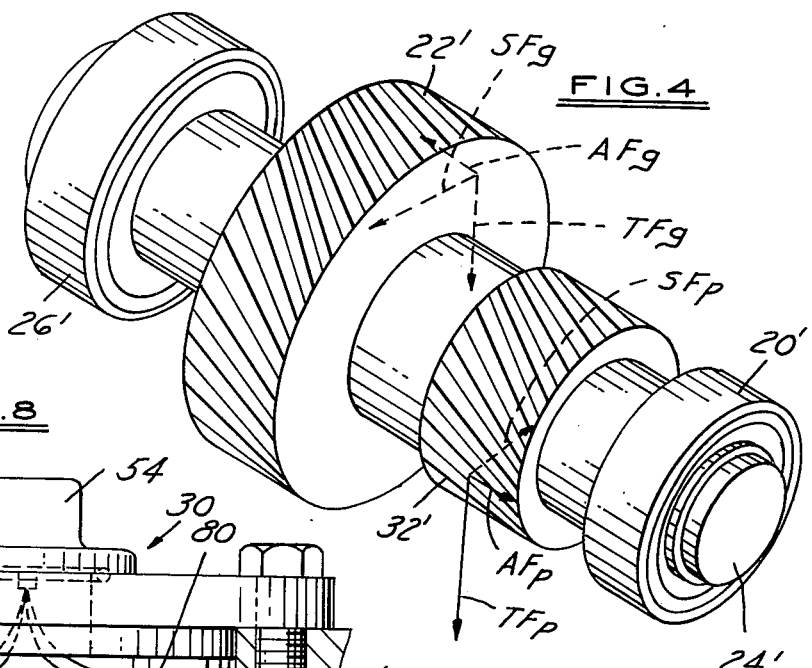
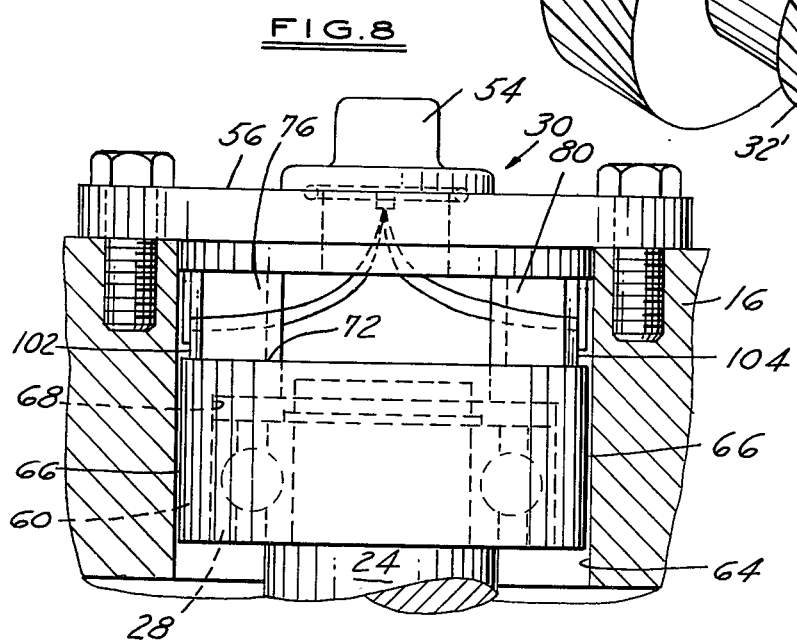

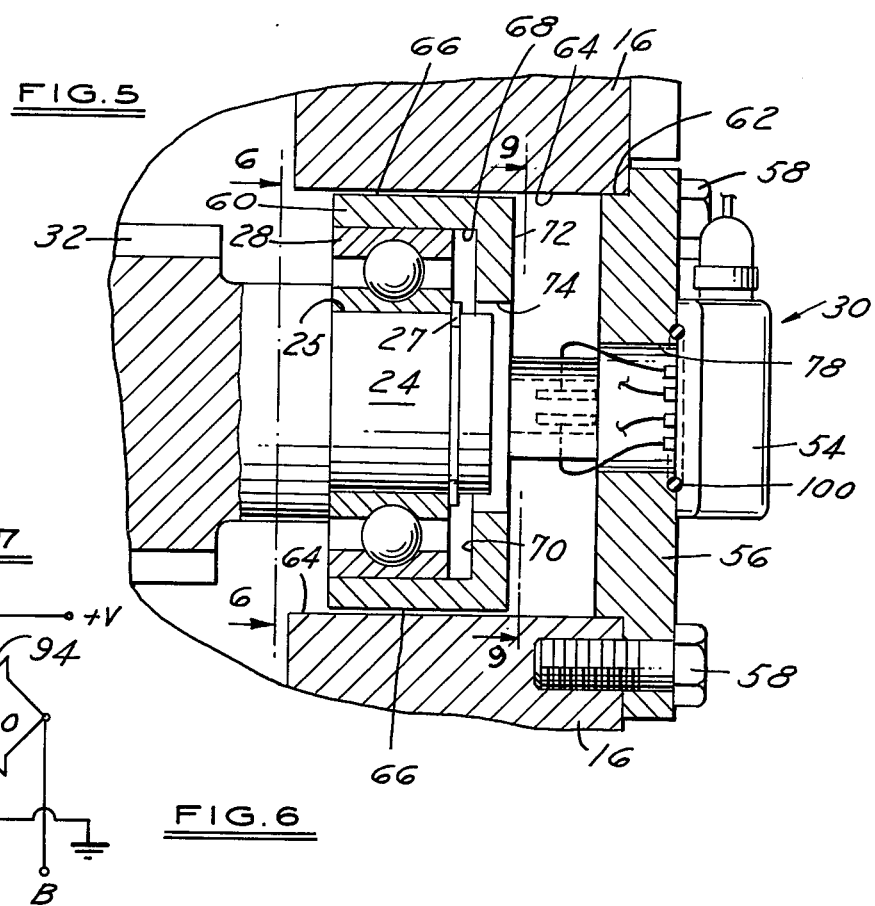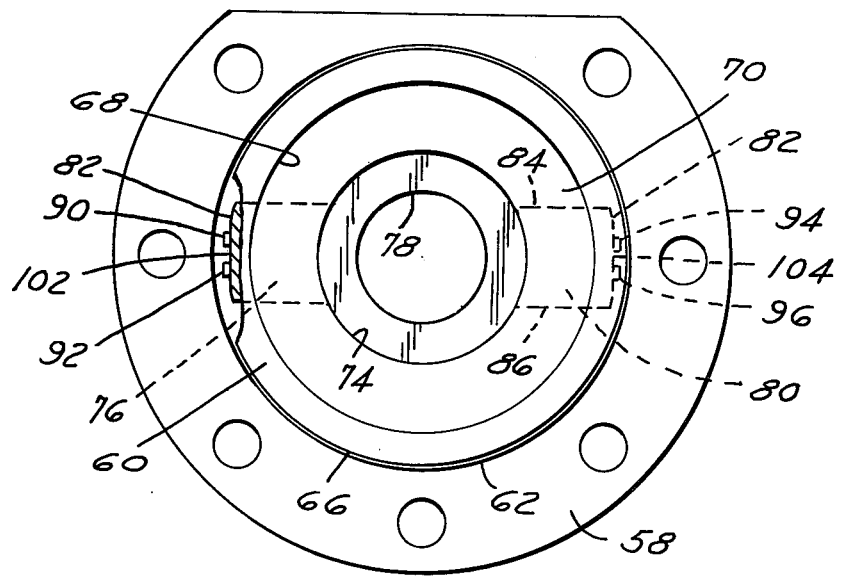

LOAD MEASUREMENT DEVICE

BACKGROUND OF THE INVENTION

1. Field of the Invention

This invention relates to torque measurement in a mechanical device such as a gear speed reducer by sensing the tangential force of the gears transmitted to one of the rotating members.

2. Description of the Prior Art

All rotating machines such as motors, generators, turbines and mechanical gear trains or transmissions have one major function in common; they produce or transmit torque. They all also absorb some torque which becomes a power loss to the overall system. The method and apparatus for sensing and measuring the torque output power and loss have been a continuous challenge to the engineers in the related field. Most methods for measuring the torque require a modification of the drive train at some point and a device inserted into it or fastened on it to measure torque, such as that described in U.S. Pat. No. 2,359,125. The device described in that patent utilizes strain gages for both the thrust and torque measurement.

Another method measuring torque shown in U.S. Pat. No. 3,595,074 consists of a pair of axially spaced plates having a plurality of flexure plates mounted therebetween wherein one plate is attached to a rotary machine housing and the other plate to the drive mechanism. The drive mechanism is supported by this torque transducer from the housing surface and is mounted in cantilever fashion at the unsupported ends of the flexure plates. The reaction or countertorque between the mounting plates, in proportion to the input or output torque, and the relative movement of one plate with respect to the other plate, is measured and hence the torque determined by use of a differential transformer, which develops an electrical signal proportional to the angle through which the end plate is rotated.

In still another U.S. Pat. No. 3,745,819, the axial thrust developed by tapered roller bearings in response to radial loads exerted on the rotating member is fed through a piston adapted to move axially against a pressure chamber to provide a pressure reading proportional to the radial load imposed on the rotatable member. This device required an additional pressurized and sealed mechanism inside the housing or attached directly to it which has many components in it and is very expensive to manufacture. Other U.S. patents, such as U.S. Pat. No. 2,957,343 shows still another method for measuring torque as a function of thrust using air pressure and in U.S. Pat. No. 1,998,450 the thrust is measured by deflecting a spring which move the plates of an electrical condenser causing a change in the capacitance which is proportional to the axial movement of a shaft. Still other methods employ slip rings and require cutting the shaft and inserting the transducer into the shaft member itself to measure the torque of that shaft. Still another method commercially available employs a Linear Variable Differential Transformer (LVDT) wherein the core position moves as a function of the shaft thrust and hence torque output of the device. Such a unit, however, is very large and requires an extensive modification of the power device.

My invention inserts a transducer into the housing which supports the shaft bearing and senses the tangential force of a rotational member. This approach is a much simpler and more compact package than previous methods and apparatus. As discussed, many methods have been used to detect the rotary motion, separating force, tangential force or axial thrust of a shaft and translate this to the torque developed by the shaft. Although some of the aforementioned patents and methods were used in conjunction with gear trains and power transmissions, none of these solved the problem of measuring the torque in a gear box in the unique way as does my invention.

A gear box and, for that matter, other power transmission systems, usually operate with a continuous bath of oil available to the gears when in use. This lubrication is necessary for translating the high speed and low torque input associated with such devices into a low speed and high torque output. Such units are designed to be as small and compact as possible. A device to measure output torque therefore, must also be small and compact in size to fit into an existing housing or space, be low in cost and capable of constant immersion in oil or other fluids, operate at varying temperatures and contaminated environments, and have a method of remote readout. This remote requirement is necessary in many applications of power transmission and gear reducers since a visual inspection during operation of the assembly itself is not always possible because of its location. Also in gear devices, as well as other machinery, bearings and shafts must maintain their position very accurately under all conditions of operation to assure proper load of the power transmitting parts to maintain minimum deflections and movements often to less than 0.001 inches. This requirement is easily met with my invention.

SUMMARY OF THE INVENTION

This invention solves the problem in gear train devices and other power transmitting equipment by measuring and monitoring the torque load directly by measuring the tangential force developed at the gears and transmitted to the rotational shaft member and its housing yet maintaining the accurate alignment of all parts.

It is an object of this invention to measure the tangential force of a rotating member by measuring minute deflection of an adaptor inserted between the shaft bearing and its gear reducer housing. It is also the object of this invention to detect this deflection by the use of strain gages mounted to this transducer.

It is an object of this invention to locate the transducer at any convenient bearing location in the drive train in a speed reducer with a predetermined clearance which will allow automatic overload protection of the transducer.

It is a further object of this invention to calibrate the readout device so that the deflection reading will be in proportion to the torque load transmitted by the shaft. It is also the object of this invention that the reading of the torque can remotely be read on a meter or recorded on a suitable instrument such as a pen or light sensitive strip chart or an oscillographic device.

It is another object of this invention to sense torque or load conditions which could cause subsequent damage to the drive motor, the gear reducer or other power transmission elements or to the load it is driving.

It is a further object of this invention to incorporate switching devices to shut down existing machinery to prevent overload damage and reduce maintenance repair.

The present invention provides an apparatus for the detection of tangential loads by sensing the tangential force as a minute stress in an adaptor supporting a rotational member. Strain gage elements are mounted to the adaptor and strategically located on it to sense the radial force developed by the contact between the gears and pinions and transmitted to the shaft bearing. As the torque or load increases in a given application, as found in a gear or speed reducer box, the speed reducer shaft will transmit the developed force to the bearings designed to accept such loading. Normally these bearings would have a cover plate in contact with the shaft bearings or a bearing carrier which prevent axial and/or radial movements of the shafts and maintain gear alignment. The transducer in this invention replaces one of these cover plates and holds the shaft bearing. The housing is modified so the transducer will fit into the same relative location to properly align the bearing or depending on usage, the bearing can be reduced in size and no housing modification is required. This adaptor or transducer is shown in a particular location for purpose of describing my invention. It should be noted that the transducer could be located at any of the bearing locations shown in FIG. 1. If the transducer is located at the input or output shafts, the electrical connector would require relocation off-set from the center of the cover plate. The strain gages mounted on the adaptor detect the minute deflection due to the load and this signal is transmitted to leads connected to an electrical receptacle and brought out to a connector and cable which will now connect to a visual indicator or to some type recorder. The strain gages are connected into a typical bridge circuit which may contain a strain gage amplifier apparatus, well known in the art and not discussed here, connected between the gages and the indicator or recorder.

This type device and method of measurement of torque loads or tangential forces in power transmission devices is almost limitless. In other words the size of the gear reducer or transmission could double in physical size and only the transducer adaptor dimensions would change to match the bearing size with a slight change in the strain gage mounting structure thickness. In most cases even the strain gages used would not be changed.

BRIEF DESCRIPTION OF THE DRAWINGS

FIG. 1 is a cross-section drawing of a typical gear reducer box;

FIG. 2 shows the mounting of the torque sensing adaptor to one end of a gear reducer box and the connection to the recorder means;

FIG. 3 is a view of a rotating member and the relative forces on a double helical pinion and gear;

FIG. 4 is a view of a rotating member and the relative forces on a single helical pinion and gear;

FIG. 5 is a cross-section of the adaptor taken along line 5—5 in FIG. 2 showing location of the strain gages;

FIG. 6 is a view of the adaptor taken along line 6—6 in FIG. 5 and removed from gear reducer box;

FIG. 7 is an electrical schematic showing the bridge network of the strain gages;

FIG. 8 is a cross-section taken along line 8—8 in FIG. 2;

DESCRIPTION OF PREFERRED EMBODIMENTS

Figure 9A:
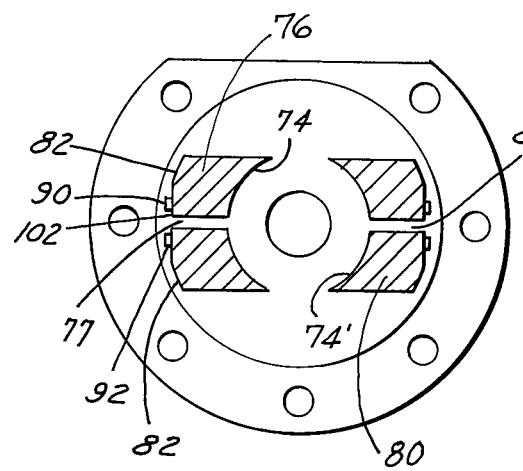
FIG. 9A is a cross-section of an optional embodiment of the shaped section taken along line 9—9 in FIG. 5 and removed from the housing.

Referring to FIG. 1 in the drawings, a typical gear reducer assembly 10 is shown in cross-section with the input shaft 12 passing through the cover 14 and mounted in housing 16 on bearings 18 with a double helical pinion gear 20 an integral part of the shaft 12. Gear 20 meshes with the double helical gear 22 which can be keyed to or be an integral part of intermediate shaft 24 and supported by a bearing 26 at one end and a bearing 28 mounted inside bearing carrier 30 which is also the transducer adaptor of the embodiment. The intermediate pinion gear 32 is usually an integral part of intermediate shaft 24. This pinion 32 meshes with the double helical main drive gear 34 keyed to main drive shaft 36 by key 38 and supported by bearings 40 mounted in housing 16. Cover plates 42 and 44 hold bearings 40 in place and locate the gearing in the housing. Cover plates 46 and 48 are mounted to housing 16 adjacent to shafts 24 and 12, to seal the housing. Bearing seals 50 and 52 seal the respective bearings to prevent loss of lubrication of the gear box and prevent dust or other contaminents from entering.

FIG. 3 shows the intermediate shaft 24, with its gears and bearings attached, removed from the gear box to show the relative forces which act upon it. TFg is the tangential force developed which is proportional to the torque transmitted by the gear when driven through shaft 12 and gear 20 when in normal operation. A separating force SFg is also developed which is proportional to the torque transmitted by the respective shaft. Each shaft will have a different torque developed by it and therefore the tangential forces are only equal at a given mesh set of gears. The tangential force is transmitted to gear 22 and shaft 24 and is noted as TFg in FIG. 3. Another tangential force TFp is also developed on the pinion gear 32 of shaft 24. Both of these forces now are in the same direction and are vectorially additive. The separating forces SFg and SFp are a function of the respective tangential forces and are vectored toward each other. The net force is very small compared to the tangential force. The combined tangential force is counteracted through the bearings attached to the shaft 24 and supported in the housing. In my invention, one of the bearings, in this case bearing 28, is mounted in a combination bearing carrier transducer 30 with strain gauges attached, which if properly located, can detect the tensional and compressive forces in the carrier transducer 30 caused by the tangential forces TFg and TFp. In FIG. 1 the tangential force is perpendicular to the paper and the stress on the strain gauges on the bearing carrier may be in either tension or compression depending on the direction of rotation of the unit.

FIG. 4 shows the relative forces on a single helical gear and because of the type of gearing it is, an additional force is developed which is an axial force ($AF_p$) parallel to the axis of the shaft, in this case shaft 24; but these also are vectorially additive and counteract each other but a net force may still exist. The tangential forces, however, are normally both in the same direction and therefore my invention would detect such a force.

FIGS. 5, 6 and 8 show the construction of the bearing carrier transducer 30 which consists of a flange 56 having an electrical connector 54 affixed thereon and bolts 58 holding the adaptor 30 piloted by diameter 62 in bore 64 to housing 16. Annulus 60 having outside diameter 66 and bore 68 form a cup-like part with inside surfaces 70 and outside surface 72. Bore 74 provides clearance for the end of shaft 24. Ribs 76 and 80 form a shaped structure connecting flange 56 to the cup-like structure at surface 72. These rib like members are machined to the proper width so they will deflect a certain amount for a given load.

Diameter 82 is machined slightly smaller than diameter 66 to facilitate mounting of the strain gages without interference. Surfaces 84 and 86 are accurately machined to be equidistant from the centerline of the axis off pilot diameter 62. Arcuate surface 74 complete the rib or shaped structure 76 and 80. The strain gages 90, 92, 94 and 96 could be mounted to the arcuate surface 82 depending on the radius of the surface. The preferred embodiment will have flats 102 and 104 interrupting surface 82 such as shown in FIG. 9A which provide a surface on which the gages may be mounted. The gage are affixed to these surfaces, 102 and 104, with an adhesive type material and electrically connected into a standard Wheatstone bridge circuit, well known in the art as shown in FIG. 7.

Figure 9B:
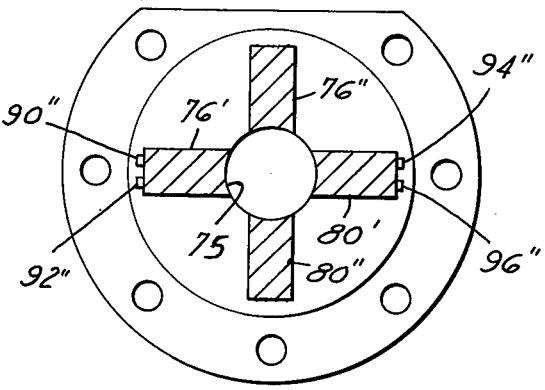
FIG. 9B is a cross-section of an optional embodiment of the shaped section of FIG. 9A.
Figure 9C:
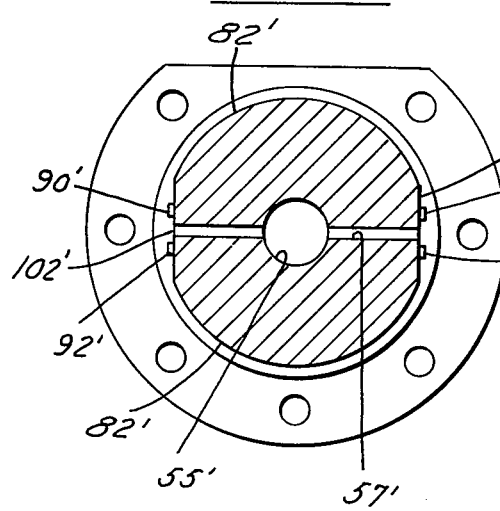
FIG. 9C is a cross-section of an optional embodiment of the shaped section of FIG. 9A.

Other embodiments of the shaped structure are shown in FIGS. 9A, 9B, 9C and 9D. In FIG. 9A the ribs or shaped structure 76 and 80 are shown having a saw cut 77 and 81 which intersect arcuate surface 74' to allow increased deflection and sensitivity of the transducer. FIG. 9B shows the shaped structure as a plurality of rib members having a clearance hole 75 for passage of the wires from the connector to the gages. The ribs 76', 76" and 80' and 80" make up the shaped structure with the strain gages 90", 92", 94" and 96" mounted thereupon. FIG. 9C shows a circular section having diameter 82' and flats 102' and 104' with strain gages 90', 92', 94' and 96' mounted thereupon. Hole 55' is similar to diameter 78 of FIG. 6 and is the opening to allow the lead wires from the gages to be brought out to the connector via the cross hole 57'.

Figure 9D:
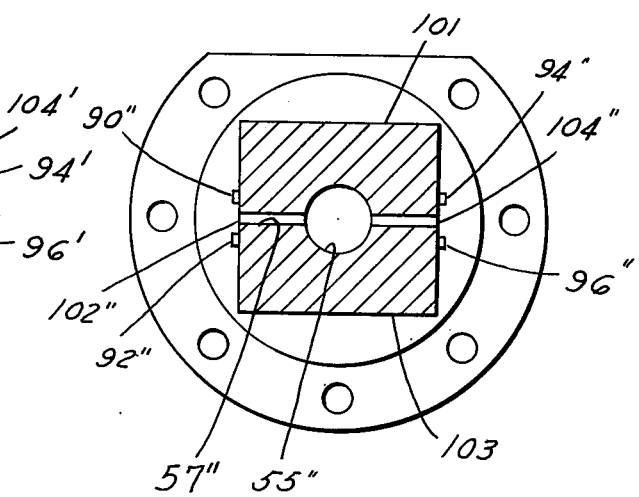
FIG. 9D is a cross-section of an optional embodiment of the shaped section of FIG. 9A.

Another embodiment of the shaped section is shown in FIG. 9D wherein the shaped member is a square section having sides 101, 102", 103 and 104". The strain gages 90", 92", 94" and 96" are mounted on surfaces 102" and 104". Hole 55" and cross hole 57" are the passages for the wires from the strain gages to the connector with hole 55" being similar to diameter 78 shown in FIG. 6. It is obvious to one skilled in the art that the shaped structure previously described could have many different cross sections configurations depending on the particular sensitivity desired and available mounting space. Also the least expensive method of manufacturing the transducer would also dictate the shape of this section.

The number of strain gages can vary from one to any reasonable number that can be conveniently mounted. In case only one strain gage is used, it would require three passive precision resistors in the other legs of the bridge circuit shown in FIG. 7. Usually a minimum of four strain gages would be used. The gages are standard commercially available gages such as manufactured by Micro-Measurements Company.

Since these gages operate either in tension or compression, there is no restriction on mounting them on the shaped structure except they should be positioned to properly sense compression or tension when under load. That is, the gages are located on the surface so they are perpendicular to the resultant tangential force (TFp and TFg) with the grids positioned in the direction of the axis of the shaft. Although only four strain gages are shown, additional gages may be used if properly spaced and connected. The gages should be mounted as close to flange 56 as possible to give maximum sensitivity. In this embodiment only the tangential force is considered and measured. It is obvious that the transducer assembly 30 could be rotated 90° and the separating force detected and measured. The preferred embodiment uses tangential force because this force is usually much larger than the separating force and a more accurate method. If the ratio of the tangential force to separating force is 10:1, the sensitivity of the device for measuring the large force is much better.

When the gages are connected in the bridge circuit as shown in FIG. 7, gages 1 and 2 must be connected in the circuit to detect the same type of stress and gages 3 and 4 similarly connected. Therefore, gages 1 and 2 must be elements 90 and 92 shown in FIG. 6 and gages 3 and 4 must be elements 94 and 96. A voltage and ground connection is made across two junctions as shown in FIG. 7 and the output signals are sensed at terminals A and B for subsequent connection to a measurement means. Bore 78 in flange 56 of FIG. 5 provides access for the circuit leads to be connected from connector 54 to gages 90, 92, 94 and 96. Indicator 88 is shown in FIG. 2 to be connected via cable 98 to output connector 54. The connector 54 is a hermetically sealed connector and is sealed by gasket 100 to flange 56 as shown in FIG. 5.

Bearing 28 is shown in FIG. 5 mounted on diameter 25 of shaft 24 and held in place by snap ring 27. The outside diameter of bearing 28 is a slip fit into diameter 68 of adaptor 30. The construction shown here is for a typical ball bearing application and it is obvious that other type bearings could be used and the relative construction would vary slightly. Clearance is shown between surface 70 and the end of bearing 28 to allow for lateral or axial movement of the shaft to allow the gear to self-align. It is possible for this clearance to be nonexistant if the bearing is pressed into contact with surface 70. This would be acceptable and not affect the unit. The clearance between diameter 66 and bore 64 is controlled and selected to have a specific clearance between the elements. This predetermined clearance provides a built-in overload protection since the adaptor ribs 76 or 80 (depending upon direction) can only deflect a specified distance before diameter 66 contacts bore 64. No further deflection will occur and no damage can occur to the transducer or gages giving longer life to the elements. This clearance is therefore subject to the load application and the maximum overload allowed.

OPERATION

A power transmission such as the gear reducer or speed reducer assembly 10, shown in FIG. 1, is driven by a prime mover through shaft 12 and ultimately converts a high speed and low torque input to the output shaft 36 as a low speed and high torque output. As the speed reducer shaft 36 picks up the load, it is transmitted back through the reducer system through the double helical or herringbone gear 34 to the pinion gear 32 on the intermediate shaft 24 which also has gear 22 affixed thereto. Gear 22 transmits the load to pinion gear 20 on shaft 12 which is ultimately picked up by the prime mover. As stated earlier any of the bearings in the system could be mounted in an adaptor 30, such as shown in FIG. 1 for the application of my invention. For purpose of this disclosure, the transducer adaptor 30 is shown operating in conjunction with the intermediate shaft 24 and its bearing 28. The inner race of bearing 28 is affixedly held to shaft 24 by snap ring 27 best seen in FIG. 5. The outer race of bearing 28 is a slip fit into bore 68 of adaptor 30. This fit allows the shaft and bearing assembly a slight movement when initially assembled so as to seek its running position when first assembled. The adaptor 30 with the strain gage and connector attached are affixed to the housing 16 by a convenient means such as bolts 58 with pilot diameter 62 accurately locating the adaptor 30 to the housing 16. Under load conditions, regardless of the direction of rotation of the gear reducer, the ribs 76 and 80 will act as a cantilever under load and deflect in proportion to the tangential force on the gears. This force will cause the strain gages 90, 92, 94 and 96 to respond to the bending load caused by the compressive strain on one rib surface and a tensile strain on the other rib surface. With the proper voltage applied as shown in FIG. 7, signals at terminals A and B will be proportional to the tangential force applied to the gears. This signal at terminals A and B will be communicated through the connection from the strain gages to connector 54, through cable 98 to the indicator 88 shown in FIG. 2. The Wheatstone bridge network is well known in the art and additional discussion is not needed except to reiterate that any number of gages may be used and if less than four are used in a given circuit, then precision resistors must be substituted in order for the bridge to function properly. A strain gage amplifier may also be used to amplify the signal depending upon the relative values and sensitivity of the measuring means. This aspect of Wheatstone bridges and amplifiers are also well known in the art and additional discussion is unwarranted.

If a given load were to increase beyond the safe working limits of its design, my invention will prevent damage to the adaptor and the strain gages by the surface 66 of annulus 60 contacting bore 64 and preventing further deflection of the rib sections. The indicator 88 or its associated circuitry would normally have limit switches in it to sense overloads and operate in conjunction with the reducer so the system could be shut down to prevent subsequent damage to personnel or machinery.

The strain gages are always connected so that gages in compression and the gages in tension are in opposite legs of the bridge. Since the gages work equally well whether in tension or compression the direction of deflection of the rib members make the unit bi-directional and no changes are required to compensate for direction of rotation shaft for proper functioning or operation of my invention.

The gages are shown mounted on flat surfaces 102 and 104. They would work equally well on an arcuate surface depending on the diameter of a given surface. The preferred embodiment would have flats machined as shown in FIG. 6 for the best mounting of the strain gages. The gages are also encapsulated in a material which will protect them from the environment within the gear reducer which is a heavy oil to lubricate all the gears in such a device. Other protection can be provided depending on the fluid or environment the adaptor is exposed to.

In summary my invention is a bearing carrier or adaptor modified to have oriented shaped members capable of deflecting when a force is applied and with strain gages attached to these members which will sense the tangential force produced in one of the shafts in the assembly which is proportional to the torque transmitted through the unit. This deflection is transmitted to a recorder or similar device where it is monitored or connected to electrical circuit elements for controlling the system or acting in the event of an overload to the system.

This invention has been described with a preference given to certain embodiments. One skilled in this art will see modifications upon reading and understanding this specification and it is my intention to include all such modifications insofar as they come within the scope of these appended claims.

I claim:

1. An apparatus for detecting and measuring the torque of a gear speed reducer means comprising a housing means, a load transmitting rotating shaft means within said housing means, said shaft means having plural bearing means connecting said shaft means to said housing means wherein the improvement comprises:

a transducer means located inside said speed reducer housing means and operatively connected between one of said bearing means and said housing means, said transducer means having a member bending in proportion to the tangential force on said rotating shaft means, said bending member 1 being positioned in line with said shaft means and said transducer means connected to an indicating means whereby said tangential force imparted to said load transmitting shaft means is measured.

2. The apparatus of claim 1 wherein said transducer means comprises an annular shaped cup-like member for holding said one bearing means, said bending member comprises rib means which connects said cup-like member to a flange means which pilots in a bore means in said housing, said transducer means having strain gage means affixedly held to said rib means, which respond to said tangential force, and said gage means are electrically connected to form a bridge network.

3. The apparatus of claim 2 wherein said cup-like member co-acts with said housing means to limit the maximum deflection of said rib means.

4. The apparatus of claim 1 wherein the gage means comprises at least two strain gages.

5. The apparatus of claim 1, wherein said transducer means comprises a cup-like member for holding said one bearing means, said bending member connected to said cup-like member and to a flange means which pilots into said housing;

strain gage means are affixedly held and positioned on said bending member to detect stress caused by said tangential force;

said gage means are electrically connected to form a Wheatstone bridge network.

6. The apparatus of claim 5 wherein said cup-like member co-acts with said housing means to limit the maximum deflection of said bending member.

7. The apparatus of claim 5 wherein the cross-section of said bending member is a square.

8. The apparatus of claim 5 wherein the cross-section of said bending member is an annulus.

9. The apparatus of claim 5 wherein the gage means comprises at least two strain gages.

10. An apparatus for detecting and measuring the torque of a power transmission means comprising a housing means,
   a load transmitting rotating shaft means is connected to said housing means by plural bearing means between said shaft means and said housing means wherein the improvement comprises:
   a transducer means is connected between said power transmission housing means and one of said shaft bearing means and is affixedly held to said power transmission housing means,
   said transducer means having a bending member means responding to the tangential force on said rotating shaft means,
   said bending member means being positioned in line with said shaft means and said transducer means connected to an indicating means whereby said tangential force imparted to said load transmitting shaft is measured.

11. The apparatus of claim 10 wherein said transducer means comprises a cup-like member for holding said one bearing means, said bending member means connected to said cup-like member and to a flange means which pilots into said housing;
   strain gage means are affixedly held and positioned on said bending member means to detect stress caused by said tangential force;
   said gage means are electrically connected to form a Wheatstone bridge network.

12. The apparatus of claim 11 wherein said cup-like member co-acts with said housing means to limit the maximum deflection of said bending means.

13. The apparatus of claim 11 wherein the gage means comprises at least two straight gages.

14. The apparatus of claim 11 wherein said bending member is a plurality of rib members.

* * * * *